(12) United States Patent
Tabellini

(10) Patent No.: US 6,422,290 B1
(45) Date of Patent: Jul. 23, 2002

(54) DAMPING DEVICE FOR TELESCOPIC GUARDS

(75) Inventor: Giorgio Tabellini, Sasso Marconi (IT)

(73) Assignee: P.E.I. Protezioni Elaborazioni Industriali S.R.L., Bologna (IT)

( * ) Notice: Subject to any disclaimer, the term of this patent is extended or adjusted under 35 U.S.C. 154(b) by 0 days.

(21) Appl. No.: 09/558,047

(22) Filed: Apr. 26, 2000

(30) Foreign Application Priority Data

Apr. 30, 1999 (IT) .......................................... B099A0207

(51) Int. Cl.[7] .............................................. E05D 15/06
(52) U.S. Cl. ........................ 160/202; 160/223; 267/139; 409/134
(58) Field of Search ................................ 160/223, 202, 160/225; 409/134; 451/454; 267/139

(56) References Cited

U.S. PATENT DOCUMENTS

| | | | | |
|---|---|---|---|---|
| 5,156,195 A | * | 10/1992 | Wehler et al. | |
| 5,863,163 A | * | 1/1999 | Wehler et al. | |
| 6,082,716 A | * | 7/2000 | Tabellini | |

FOREIGN PATENT DOCUMENTS

| | | | |
|---|---|---|---|
| DE | U-7137781 | | 11/1972 |
| DE | 8901686 | * | 5/1989 |
| DE | 3829984 | * | 10/1989 |
| EP | 290822 | | 11/1988 |
| EP | 502328 | | 9/1992 |
| EP | 832715 | * | 4/1998 |
| EP | 1074337 | * | 2/2000 |
| EP | 1048399 | * | 11/2000 |

\* cited by examiner

*Primary Examiner*—Blair M. Johnson
(74) *Attorney, Agent, or Firm*—Fay, Sharpe, Fagan, Minnich & McKee, LLP

(57) ABSTRACT

The invention relates to a damping device for telescopic guards of the type having a plurality of tubular covering elements that slide inside each other in a defined direction, and that have a front edge and a rear edge with a first stop portion and a second stop portion, respectively. The damping device is equipped with at least one shock absorber located and acting between the rear edge and at least one of the stop portions, the shock absorber comprising a portion for connecting it to the rear edge or to the first stop portion, and at least one flexible arm attached at one end to the connecting portion. The free end of at least one of the arms is attached to a damper made of a resilient material and being larger in cross section than the arm, the arm and the related damper being designed to absorb the shocks that occur between two adjacent tubular elements when the telescopic guard is being extended or retracted.

3 Claims, 7 Drawing Sheets

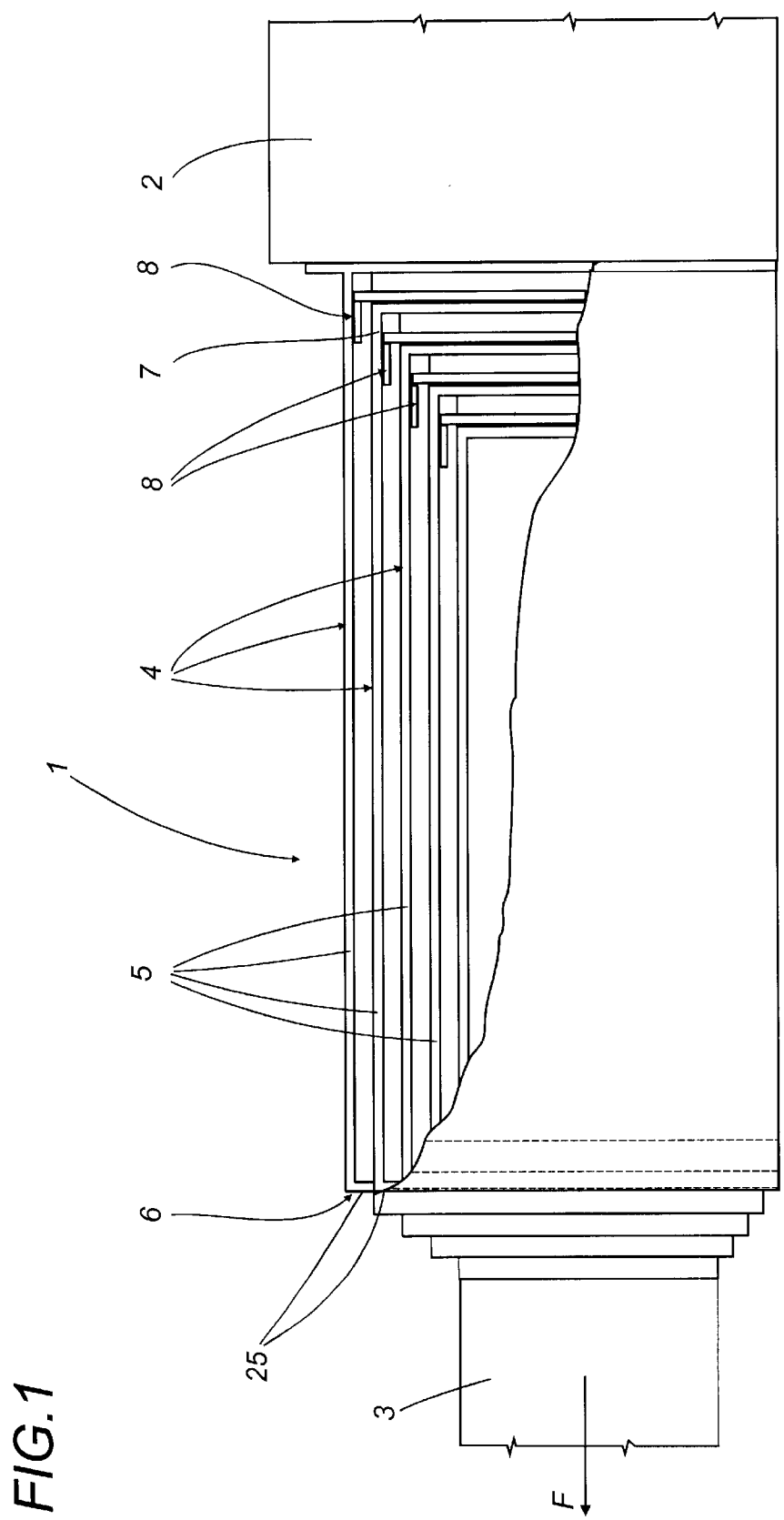

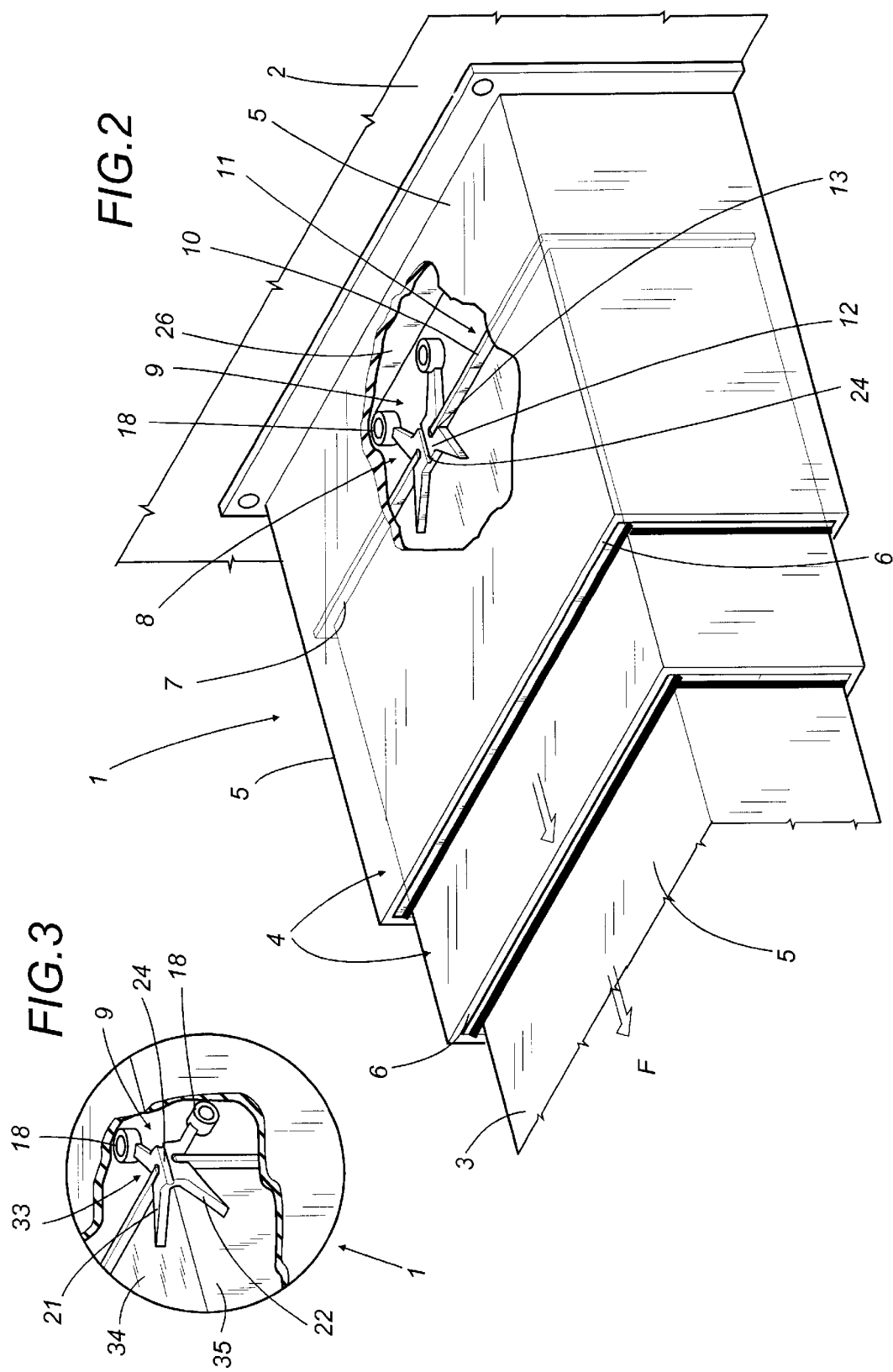

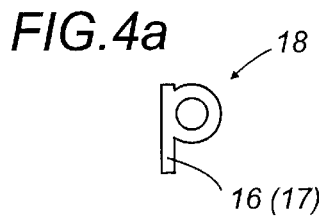
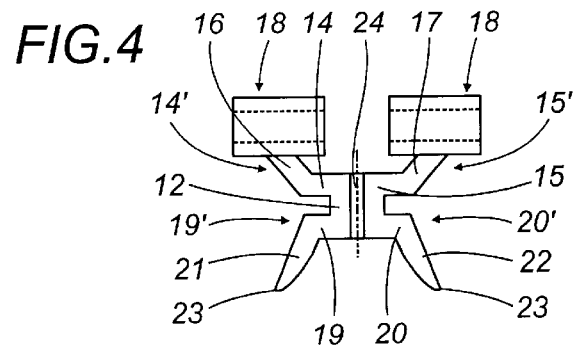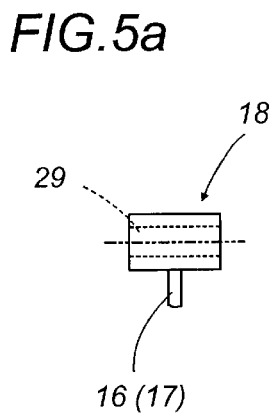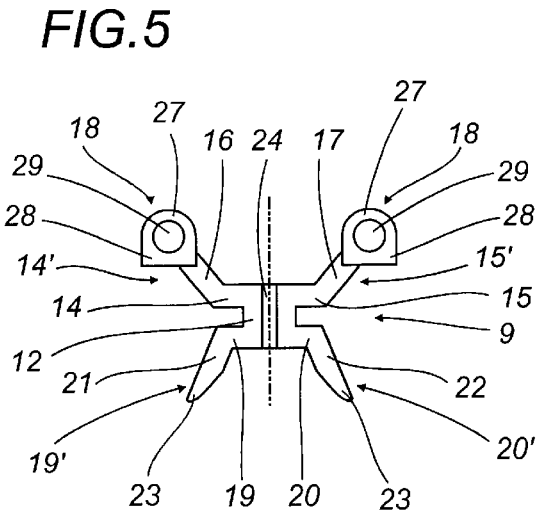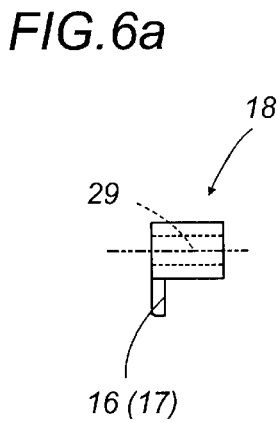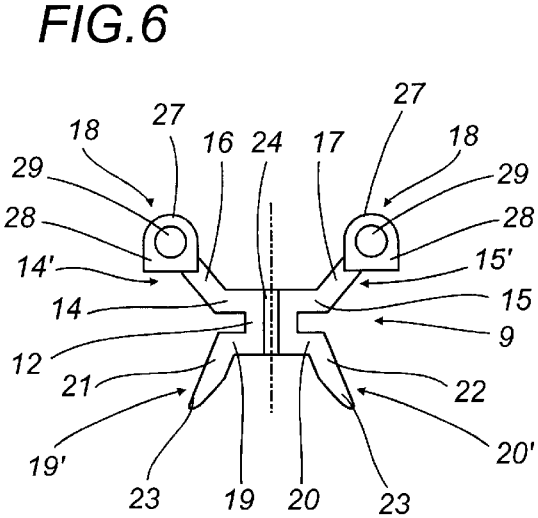

… (continued)

DAMPING DEVICE FOR TELESCOPIC GUARDS

BACKGROUND OF THE INVENTION

The present invention relates to a damping device for telescopic guards.

The invention concerns in particular a damping device for a telescopic guard that consists of a plurality of box-shaped elements connected to each other in pairs and in such a way that they can slide over each other.

Guards of this kind are used typically to protect the guides of automatic machinery, machine tools and robot-controlled equipment to prevent dirt, chippings, and coolant from coming into contact with the guides.

Built into the box-shaped elements there are scrapers, usually made of elastomer or plastic. These scrapers, besides preventing extraneous objects from making their way into the space between two contiguous box-shaped elements, provide a satisfactory seal between the box-shaped elements.

Since the guards concerned are connected to the moving parts of the machines on which they are installed, the box-shaped elements telescopically extend at the same speed as that at which the machine parts move. The speed may therefore be very high and creates a considerable shock between the box-shaped elements when they reach the fully extended position owing to the considerable size and weight of each element. These shocks must obviously be avoided not only to lessen wear on the guards but also to prevent damage to machine parts and to reduce noise.

It is therefore essential to fit damping devices between the box-shaped elements.

An example of a damping device used for this purpose is described in utility patent DE-U-7137781. In this publication, the damping effect is obtained by simply applying a strip of synthetic cellular material to the rear end of each scraper, in the area where it comes into contact with the smaller box-shaped element adjacent to Patent EP-B-290822 discloses another damping device for the box-shaped elements of a telescopic guard. In this case, too, the damping device is made from a strip of synthetic material different from the material which the scraper is made of.

To augment the damping effect of the devices made from strips of synthetic material, the strip of synthetic material may have holes made in it, as described in patent EP-B-502328, in order to make the strip deform more easily.

Despite the use of these damping devices, the guards are still subjected to shocks that are all but negligible on account of the high speeds reached by the moving machine parts, the weight of the box-shaped elements and the limited extent to which the damping devices themselves can be deformed.

Further, when the guards reach the fully extended position, the box-shaped elements come to a complete stop, passing from a very high speed to zero speed in a very small space and in a very short time. They are therefore subjected to a very sudden deceleration which may have damaging effects on the moving machine parts.

Moreover, since the damping devices of the type described above are applied along the entire edge of each box-shaped element, they also have a relatively high cost.

The aim of the present invention is to improve the shock absorbing effect of the elements from which the above mentioned guards are made.

SUMMARY OF THE INVENTION

Accordingly, the invention provides a damping device for telescopic guards, said guards comprising a plurality of tubular covering elements that slide inside each other in a defined direction, each tubular element having a front edge and a rear edge, the front edge having a first stop portion which comes into contact with the rear edge of a tubular element when the tubular elements slide out of each other, and the rear edge having a second stop portion which comes into contact with the rear edge of a tubular element when the tubular elements are retracted into each other, the damping device comprising at least one shock absorber located and acting between the rear edge and at least one of the stop portions, said shock absorber comprising a portion for connecting it to the rear edge or to the first stop portion, and at least one flexible arm extending from the connecting portion and comprising at least one damper.

BRIEF DESCRIPTION OF THE DRAWINGS

The present invention will now be described with reference to the accompanying drawings which illustrate preferred embodiments of it and in which:

FIG. 1 is a schematic side view of a telescopic guard equipped with a damping device made according to a first embodiment of the present invention;

FIG. 2 is a perspective view of a part of the telescopic guard shown in FIG. 1, equipped with a damping device of the same type as that in FIG. 1 but located in a different place from that shown in FIG. 1;

FIG. 3 is a perspective detail view showing a part of one of the guards illustrated in the figures described above; and FIGS. 4 to 17 and the corresponding FIGS. 4a to 17a, which appear next to them in the same numeric sequence, illustrate in plan views and partial side views, respectively, different embodiments of the damping device forming the subject matter of the present invention.

DESCRIPTION OF THE PREFERRED EMBODIMENTS

Figure 7A:
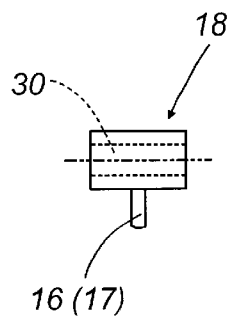
Figure 7:
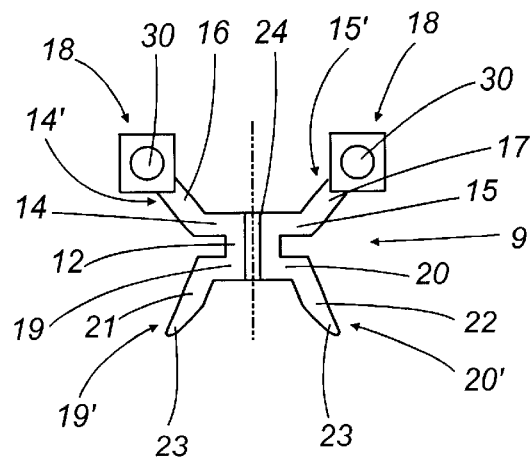
Figure 8A:
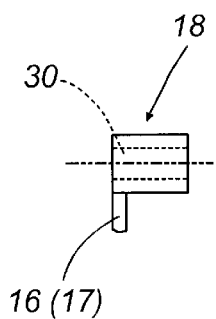
Figure 8:
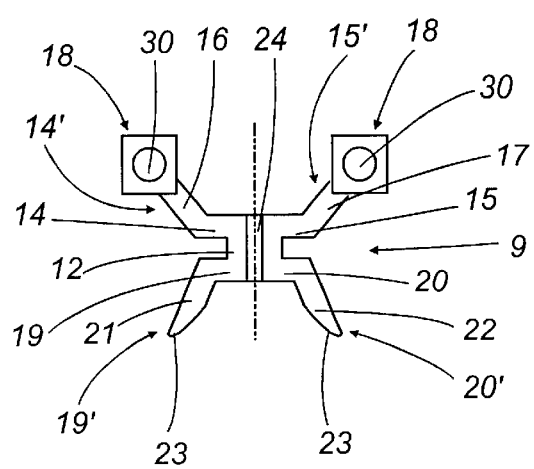

FIGS. 1 to 3 illustrate a telescopic guard labeled 1 as a whole, used for the guides of automatic machines, machine tools and robot-controlled equipment (not illustrated). The telescopic guard 1 is connected at one end to a fixed part 2 of the machine, and at the other end to a mobile part 3 of the machine, and can be extended in the direction indicated by the arrow F.

The telescopic guard 1 comprises a plurality of tubular elements 4 that are telescopically connected to each other in pairs and that have at least one wall 5, a front edge 6 and a rear edge 7. These tubular elements 4 may be made of steel, for example, and are of known type.

Each tubular element 4 is equipped with a damping device 8.

As shown in particular in FIGS. 1 and 3, the damping device 8 comprises a shock absorber 9 fixed to the rear edge 10 of a section 11. The section 11 is fixed to the rear edge 7 of the tubular element 4.

The shock absorber 9, which is indicated as a whole with the same reference number in all its embodiments illustrated in FIGS. 4 to 17, comprises a flat central portion 12 which is substantially rectangular in shape (for example) and which is designed to be inserted into an appropriate slot 13 made in the rear edge 10 of each tubular element 4.

As shown in particular in FIGS. 4 to 15, from each of the corner portions that appear at the top of the central portion 12 in the drawings, there extend an arm 14' (located on the left in the drawings) starting with a straight, flexible section 14 positioned horizontally and extending towards the left, and an arm 15' (located on the right) starting with a straight, flexible section 15 positioned horizontally and extending towards the right. The sections 14 and 15 extend in opposite directions starting from the ends connected to the central portion 12, and at the ends of them that are further away from the central portion 12 there are two other sections 16 and 17 that extend upwards and (with reference in particular to the embodiments illustrated in FIGS. 4 to 14) at an angle to the horizontal X-axis of a Cartesian reference system (not illustrated) of approximately 37°30' and 142° 30, respectively. The angle subtended by the sections 16 and 17 is preferably between 95° and 175° and is ideally approximately 105°.

The free end of each of the sections 16 and 17 is connected to a damper, labeled 18 in all the embodiments illustrated in FIGS. 4 to 17. Some preferred embodiments of the damper 18 illustrated in the accompanying drawings are described in more detail below.

Figure 16A:
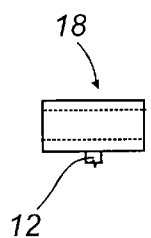
Figure 16:
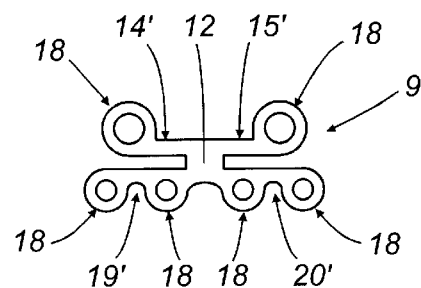

As shown in FIG. 16, from each of the corner portions that appear at the top of the central portion 12 in the drawings, there extend a straight flexible arm 14' (located on the left in the drawing) positioned horizontally and extending towards the left, and a straight flexible arm 15' (located on the right) positioned horizontally and extending towards the right. The arms 14' and 15' extend in opposite directions starting from the ends connected to the central portion 12.

The free end of each of the arms 14' and 15' is connected to a damper 18.

Figure 17A:
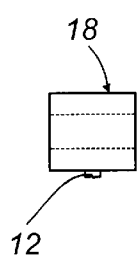
Figure 17:
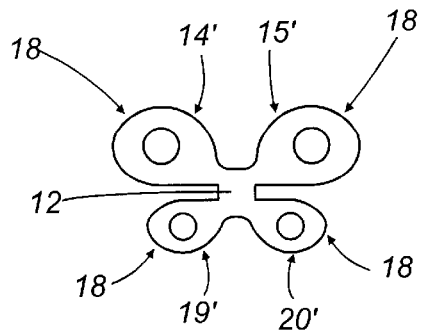

FIG. 17 shows lobe-shaped arms 14' and 15', each constituting a damper 18 and extending from each of the corner portions that appear at the top of the central portion 12 in the drawing.

With reference to FIGS. 4 to 15, from each of the corner portions that appear at the bottom of the central portion 12 in the drawings, there extend an arm 19' (located on the left) starting with a straight, flexible section 19 positioned horizontally and extending towards the left, and an arm 20' (located on the right) starting with a straight, flexible section 20 positioned horizontally and extending towards the right. The sections 19 and 20 extend in opposite directions starting from the ends connected to the central portion 12, and at the ends of them that are further away from the central portion 12 there are two other sections 21 and 22 that extend downwards at an angle to the horizontal X-axis of a Cartesian reference system (not illustrated) of approximately −68° and −112°, respectively. The angle subtended by the sections 21 and 22 is preferably between 35° and 175° and is ideally approximately 44°.

The free ends of the sections 21 and 22 of the arms 19' and 20' preferably have the shape of a rounded point or are shaped in such a way as to have a pointed end 23. The purpose of the pointed end 23 is explained below where the operation of the shock absorber 9 is described.

With reference to FIG. 16, an arm 19' and an arm 20' extend in a substantially straight, horizontal direction from each of the corner portions that appear at the bottom of the central portion 12 in the drawing, the arms 19' and 20' extending, in the drawing, to the right and to the left of the portion 12, respectively. Thus, the arms 19' and 20' extend in opposite directions starting from the ends connected to the central portion 12.

In another embodiment that is not illustrated, the substantially straight directions in which the arms 19' and 20' extend are incident and the angle subtended by them is between 90° and 180°.

FIG. 17 shows lobe-shaped arms 19' and 20', each constituting a damper 18 and extending from each of the corner portions that appear at the top of the central portion 12 in the drawing.

For the reasons explained below, the central portion 12 of each shock absorber 9 preferably has a lightening groove 24 extending in a direction perpendicular to the lengthways directions of the sections 14, 15, 19, 20.

The shock absorber 9 may be made of metal, for example spring steel, with a plastic coating to reduce wear on the contact surfaces, and the dampers 18 are preferably made entirely of a resilient material such as rubber of plastic. Alternatively, the shock absorber 9 may be made entirely of plastic with suitable elastic properties.

Below is a description of how the telescopic guard 1 equipped with the shock absorbers 9 operates, starting from an initial condition where the telescopic guard 1 is in the condition shown in FIG. 1. In FIG. 1, the tubular elements 4 are fully retracted and almost entirely nested inside each other. The tubular elements slide relative to each other in a conventional manner on sliding blocks or runners of known type.

When the mobile part 3 of the automatic machine, machine tool or piece of robot-controlled equipment moves, the telescopic guard 1 starts extending in the direction of the arrow F.

In FIG. 2, two tubular elements 4 are shown in the almost fully extended position but with the shock absorber 9 not yet in operation.

As the guard continues to extend, the shock absorber 9 comes into contact with a stop portion 25 of the adjacent, larger-sized tubular element 4. The special rounded or pointed shape of the ends 23 of the sections 21 and 22 of the shock absorber 9 enables the sections 21 and 22 to move apart more smoothly by facilitating the sliding of the ends 23 when they come into contact with the stop portion 25 adjacent to the shock absorber 9. At the same time, the sections 19 and 20, initially straight, tend to bend and, when the guard 1 is in the final, fully extended position where the shock is being completely absorbed, the sections 19, 20, 21 and 22 are so deformed as to form a substantially straight line in contact with the adjacent stop 25.

The shocks between the tubular elements 4 that occur when the guard 1 reaches its fully retracted, end-of-stroke position are absorbed by the sections 14, 15, 16, 17 and by the dampers 18 which are counteracted by appropriate stop portions 26 (only one of which is shown in FIG. 2) located on each tubular element on the side facing the fixed part 2 of the machine.

Just before reaching the end-of-stroke position, when the dampers 18 of a shock absorber 9 come into contact with the stop portion 26 of the adjacent, larger-sized tubular element 4, the sections 16 and 17 begin moving apart, and the sections 14 and 15, initially straight, tend to bend. When the guard is almost fully retracted, the sections 14, 15, 16 and 17 are so deformed as to form a substantially straight line in contact with the adjacent stop 26.

The instant before retraction is completed, the dampers 18 of the shock absorber 9 are compressed and are deformed so as to provide an additional, final shock absorbing action which is even more decisive than that provided by the sections 14, 15, 16 and 17 and which completely absorbs the shocks between the tubular elements 4 making up the telescopic guard 1.

Each of the dampers 18 shown in FIGS. 4 and 4a is shaped substantially like a hollow cylinder, extending along an axis parallel to the direction of the sections 14 and 15 and parallel to the plane in which the sections 14, 15, 16 and 17 lie. The hollow cylinder is connected, along the center line of a peripheral portion of it, to the free end of the corresponding section 16, 17.

Each of the dampers 18 shown in FIGS. 5 and 5a is shaped substantially like a solid resulting from the union of a half-cylinder 27 and a rectangle parallelepiped 28. The flat lateral surface of the half-cylinder 27 forms one of the lateral surfaces of the rectangle parallelepiped 28 and the resulting solid has a circular hole 29 passing through it, extending along an axis parallel to the generators of the half-cylinder 27 and perpendicular to the plane in which the sections 14, 15, 16 and 17 lie. This solid is connected, along the center line of a peripheral portion of it, to the free end of the corresponding section 16, 17.

The dampers 18 shown in FIGS. 6 and 6a differ from those shown in FIGS. 5 and 5a in that each is connected to the free end of the corresponding section 16, 17 at an axial end portion.

The dampers 18 shown in FIGS. 7, 7a and 8, 8a differ from those shown in FIGS. 5, 5a and 6, 6a, respectively, in that their cross section is substantially square shaped with a circular hole 30 through the center of it.

Figure 9A:
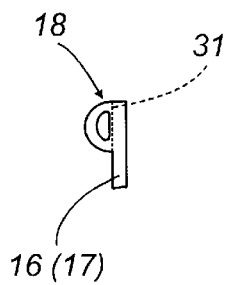
Figure 9:
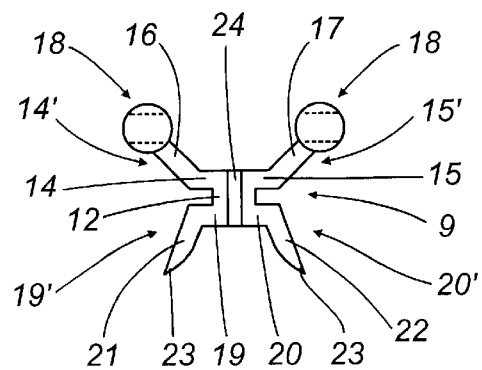

Each of the dampers 18 shown in FIGS. 9 and 9a is shaped, in cross section, substantially like a hollow half-cylinder, with the flat lateral surface 31 connected to an end portion of the corresponding section 16, 17. The face 31 of the dampers 18 lies in the same plane as the plane in which the sections 14, 15, 16 and 17 lie.

Figure 10A:
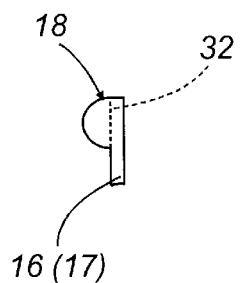
Figure 10:
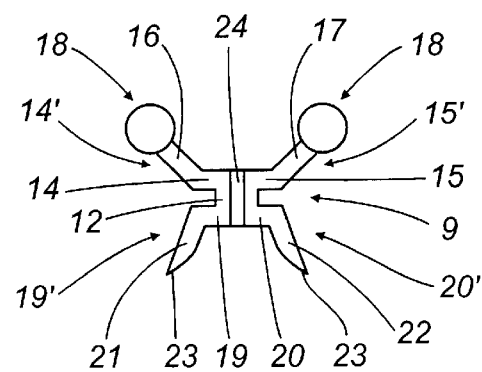

The dampers 18 shown in FIGS. 10 and 10a are substantially hemispherical in shape, and each is connected to an end portion of the corresponding section 16, 17. The flat lateral surface 32 which partially delimits each of the dampers 18 concerned lies in the same plane as the plane in which the sections 14, 15, 16 and 17 lie.

Figure 11A:
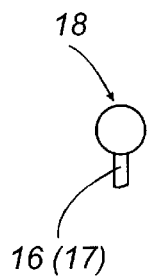
Figure 11:
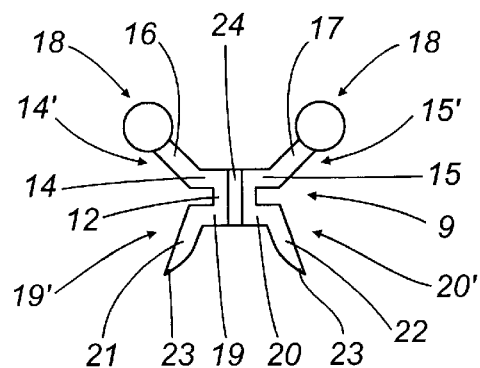

The dampers 18 shown in FIGS. 11 and 11a are substantially spherical in shape, and each is connected to an end portion of the corresponding section 16, 17.

Figure 12A:
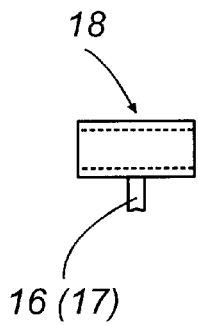
Figure 12:
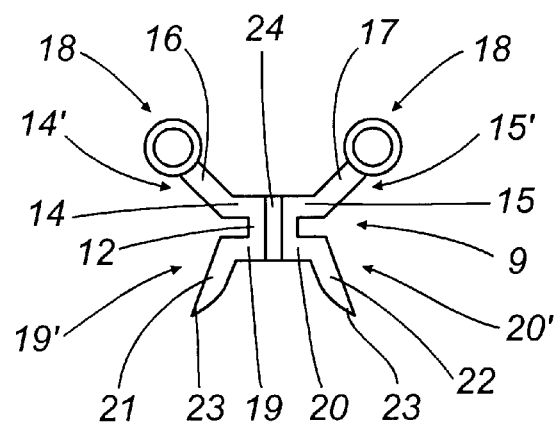

Each of the dampers 18 shown in FIGS. 12 and 12a is shaped substantially like a hollow cylinder, extending along an axis perpendicular to the plane in which the sections 14, 15, 16 and 17 lie. The hollow cylinder is connected, along the center line of a peripheral portion of it, to the free end of the corresponding section 16, 17.

Figure 13A:
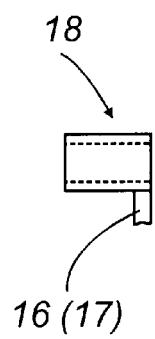
Figure 13:
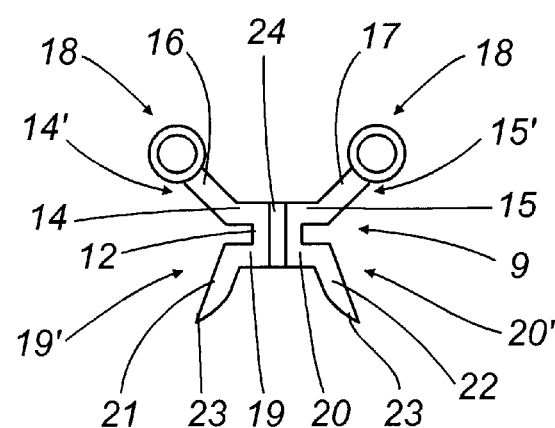

The dampers 18 shown in FIGS. 13 and 13a differ from those shown in FIGS. 12 and 12a in that each is connected to the free end of the corresponding section 16, 17 at an axial end portion.

Figure 14A:
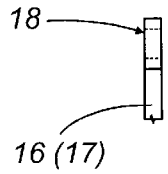
Figure 14:
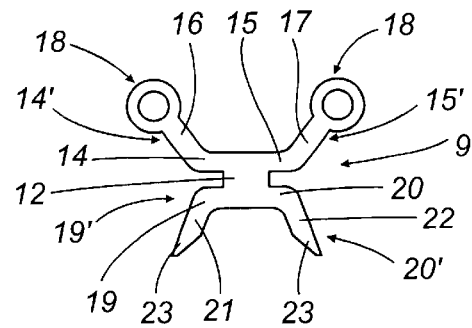

Each of the dampers 18 shown in FIGS. 14 and 14a is shaped substantially like a hollow cylinder, extending along an axis perpendicular to the plane in which the sections 14, 15, 16 and 17 lie. The axial length of the hollow cylinder is substantially equal to the thickness of the sections 14, 15, 16 and 17 measured perpendicular to the plane of the figure.

Figure 15A:
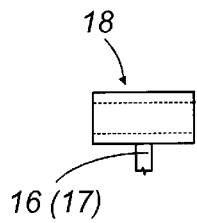
Figure 15:
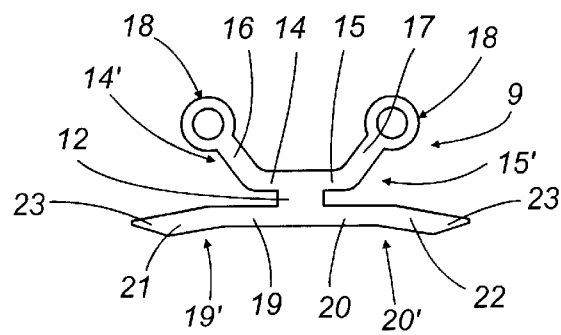

The dampers 18 shown in FIGS. 15 and 15a are shaped substantially like hollow cylinders, extending along an axis perpendicular to the plane in which the sections 14, 15, 16 and 17 lie. Each hollow cylinder is connected, along the center line of a peripheral portion of it, to the free end of the corresponding section 16, 17. In an embodiment that is not illustrated, this hollow cylinder may be connected to the free end of the corresponding section 16, 17 at an axial end portion.

The dampers 18 shown in FIGS. 16 and 16a differ in the configuration of the pair of arms to which they are connected. Thus, each of the upper arms 14', 15' has a damper 18 shaped substantially like a hollow cylinder extending along an axis perpendicular to the plane in which the arms 14', 15' themselves lie. The hollow cylinder is connected, along the center line of a peripheral portion of it, to the free end of the corresponding arm 14', 15'.

Each of the lower arms 19', 20', on the other hand, has two dampers 18 made on it which form the structure of the arm itself. In an embodiment that is not illustrated, the hollow cylinder may be connected to the free end of each arm 14', 15' at a corresponding axial end portion of the cylinder itself.

Each of the dampers 18 shown in FIGS. 17 and 17a is shaped substantially like a hollow lobe and forms a single block with the corresponding arm 14', 15', 19', 20'.

As shown in FIG. 3, the shock absorber 9 may be fitted at the corner along the edge 33 between a horizontal wall 34 and a vertical wall 35 of the mobile tubular elements 4.

The corner configuration helps keep the telescopic guard 1 straight when it reaches the fully extended or fully retracted position and makes it possible to reduce the number of shock absorbers 9 to two for each tubular element 4, thus making it a very economical solution.

The groove 24 is designed to facilitate the bending of the shock absorber 9 on the horizontal wall 34 and on the vertical wall 35 of the tubular element 4 to which the shock absorber 9 is fitted.

The shock absorbing effect is achieved by several different factors, described below.

Initially, when the telescopic guard 1 moves in the direction of the arrow F, the end 23 slides on the stop portion 25, the sections 21 and 22 move apart and, as a result, the sections 19 and 20 start bending. As the sections 19 and 20 bend, the central portion 12 is stretched.

This absorbing effect also applies to the shock absorber 9 during the retraction of the guard 1 except that in this case, the absorbing effect of the sections 14, 15, 16 and 17 is followed by a final powerful absorbing action provided by the dampers 18.

It is evident that the shock absorbing capacity of the damping device 8 described herein is appreciably greater than that of known damping devices.

As a result of the considerable shock absorbing effect of the damping device 8, only a few shock absorbers 9 need to be fitted to the tubular elements 4 and, in some cases, only one shock absorber 9 is required on each tubular element 4.

The invention can be subject to numerous modifications and variations without thereby departing from the scope of the inventive concept.

For example, in an embodiment of the invention that is not illustrated in the drawings, suitably shaped dampers 18 might be connected also to the free ends of the sections 21 and 22 or only to the free ends of the sections 21 and 22.

Moreover, a simplified embodiment of the invention might not comprise the sections 19, 20, 21 and 22 at all and, instead, spring stop elements (not illustrated) might be fitted permanently to the stop portion 25 of each tubular element 4 so as to absorb the shock received by the tubular elements 4 when they reach the fully extended position.

Another simplified embodiment of the invention might not comprise the sections 19, 20, 21 and 22 at all and, instead the shock absorbers 9 might be positioned, relative to the tubular elements 4, in such a way that the dampers 18 can act in conjunction with the stop portions 25. Again, this embodiment might also comprise spring stop elements (not illustrated) fitted permanently to the stop portion 26 of each tubular element 4 so as to absorb the shock received when the fully retracted position is reached.

In yet another embodiment of the invention, the sections 19, 20, 21 and 22 might not be envisaged and the shock absorbers 9 might be connected to corresponding parts of the stop portions 25 so that, when the corresponding tubular element 4 reaches the fully extended position, they act in conjunction with the stop portion 26 of the tubular element 4 surrounding the tubular element 4 concerned. In this case, spring stop elements (not illustrated) might be connected permanently to the rear surface, with reference to the arrow F, of the stop portion 26 of each tubular element 4 in order to damp the retraction stroke in conjunction with the front surface of the stop portion 26 of the tubular element 4 surrounding the tubular element 4 concerned.

Besides being able to fit the shock absorbers 9 to the telescopic guard 1 in all of the ways described above, the shock absorbers 9 in any case have numerous advantages over known damping devices, even if the number of arms equipped with dampers 18 is different from that in all the embodiments described above. In fact, even shock absorbers with one arm having one damper 18 at the end of it have proved to be more effective than previously known damping devices.

Moreover, all the details of the invention may be substituted by technically equivalent elements.

What is claimed is:

1. A damping device for telescopic guards, said guards comprising a plurality of tubular covering elements that slide inside each other in a defined direction, each tubular element having a front edge and a rear edge, the front edge having a first stop portion which comes into contact with the rear edge of a tubular element when the tubular elements slide out of each other, and the rear edge having a second stop portion which comes into contact with the rear edge of a tubular element when the tubular elements are retracted into each other, the damping device comprising at least one shock absorber located and acting between the rear edge and at least one of the stop portions, said shock absorber comprising a portion for connecting it to the rear edge or to the first stop portion, and at least one flexible arm extending from the connecting portion and comprising at least one damper which presents an expansion of an end of the flexible arm opposite to the connecting portion, wherein each flexible arm comprises a first section that is substantially perpendicular to the defined direction of sliding of the tubular elements, and a second section connected to the first section extending obliquely away from the first section relative to the defined direction of sliding of the tubular elements; there being a damper on a free end of the second section, wherein each of the dampers is shaped substantially like a solid resulting from the union of a half-cylinder and a rectangle parallelepiped, a flat lateral surface of the half-cylinder forming a lateral surface of the rectangle parallelepiped and the solid having a circular hole passing therethrough, extending along an axis parallel to generators of the half-cylinder and perpendicular to a plane in which the first and second sections lie, this solid being connected, along a center line of a peripheral portion of the solid, to the free end of the corresponding second section.

2. A damping device for telescopic guards, said guards comprising a plurality of tubular covering elements that slide inside each other in a defined direction, each tubular element having a front edge and a rear edge, the front edge having a first stop portion which comes into contact with the rear edge of a tubular element when the tubular elements slide out of each other, and the rear edge having a second stop portion which comes into contact with the rear edge of a tubular element when the tubular elements are retracted into each other, the damping device comprising at least one shock absorber located and acting between the rear edge and at least one of the stop portions, said shock absorber comprising a portion for connecting it to the rear edge or to the first stop portion, and at least one flexible arm extending from the connecting portion and comprising at least one damper which presents an expansion of an end of the flexible arm opposite to the connecting portion, wherein each flexible arm comprises a first section that is substantially perpendicular to the defined direction of sliding of the tubular elements, and a second section connected to the first section extending obliquely away from the first section relative to the defined direction of sliding of the tubular elements; there being a damper on a free end of the second section, wherein each of the dampers is shaped substantially like a solid resulting from the union of a half-cylinder and a rectangle parallelepiped, a flat lateral surface of the half-cylinder forming a lateral surface of the rectangle parallelepiped and the solid having a circular hole passing therethrough, extending along an axis parallel to generators of the half-cylinder and perpendicular to a plane in which the first and second sections lie, this solid being connected to a free end of the corresponding second section at an axial end portion of the solid.

3. A damping device for telescopic guards, said guards comprising a plurality of covering elements that slide inside each other in a defined direction, each covering element having a front edge and a rear edge, the front edge having a first stop portion which comes into contact with the rear edge of a covering element when the covering elements slide out of each other, and the rear edge having a second stop portion which comes into contact with the rear edge of a covering when the covering elements are retracted into each other, the damping device comprising at least one shock absorber located and acting between the rear edge and at least one of the stop portions, said shock absorber comprising:

a portion for connecting the shock absorber to one of the rear edge and the first stop portion;

a flexible arm having a first end connected to the connecting portion and a second end spaced outwardly away from the connecting portion; and, a damper connected to and located at the second end of the flexible arm, said damper defined from resilient material and having a cross-section larger than a corresponding cross-section of said second end of said arm, said damper further defining a hollow region therein.

* * * * *